US011670787B2

(12) United States Patent
Taruya et al.

(10) Patent No.: US 11,670,787 B2
(45) Date of Patent: Jun. 6, 2023

(54) POWER SUPPLY CONTROL SYSTEM, POWER SUPPLY CONTROL METHOD, AND STORAGE MEDIUM

(71) Applicant: HONDA MOTOR CO., LTD., Tokyo (JP)

(72) Inventors: Kenji Taruya, Wako (JP); Daishi Igarashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 97 days.

(21) Appl. No.: 17/336,380

(22) Filed: Jun. 2, 2021

(65) Prior Publication Data
US 2021/0384531 A1 Dec. 9, 2021

(30) Foreign Application Priority Data
Jun. 4, 2020 (JP) .............................. JP2020-097578

(51) Int. Cl.
| | |
|---|---|
| H01M 8/04 | (2016.01) |
| H01M 8/04858 | (2016.01) |
| H01M 16/00 | (2006.01) |
| B60L 58/30 | (2019.01) |
| B60L 50/50 | (2019.01) |
| B60L 50/75 | (2019.01) |
| H01M 8/04664 | (2016.01) |

(52) U.S. Cl.
CPC .......... *H01M 8/0494* (2013.01); *B60L 50/50* (2019.02); *B60L 50/75* (2019.02); *B60L 58/30* (2019.02); *H01M 8/04671* (2013.01); *H01M 16/006* (2013.01); *H01M 2250/20* (2013.01)

(58) Field of Classification Search
CPC . H01M 8/0494; H01M 2250/20; B60L 50/50; B60L 50/75; B60L 58/30
USPC ....................................................... 429/430
See application file for complete search history.

(56) References Cited

U.S. PATENT DOCUMENTS

2020/0112041 A1* 4/2020 Ito .......................... H01M 16/00

FOREIGN PATENT DOCUMENTS

| JP | 2016-103460 | 6/2016 |
|---|---|---|
| WO | 2011/036765 | 3/2011 |
| WO | 2019/168398 | 9/2019 |

OTHER PUBLICATIONS

Extended European Search Report for European Patent Application No. 21177060.7 dated Oct. 29, 2021.

* cited by examiner

*Primary Examiner* — James M Erwin
(74) *Attorney, Agent, or Firm* — Amin, Turocy & Watson, LLP (57) ABSTRACT

According to an embodiment, a power supply control system includes a state acquirer configured to acquire states of a plurality of fuel cell systems mounted in an electric device that operates using electric power, a power acquirer configured to acquire a required amount of electric power from the electric device, and a power generation controller configured to control power generation of one or more fuel cell systems among the plurality of fuel cell systems so that the required amount of electric power acquired by the power acquirer is satisfied on the basis of the state of each of the plurality of fuel cell systems acquired by the state acquirer.

10 Claims, 7 Drawing Sheets

| | TOTAL POWER GENERATION TIME PERIOD | POWER GENERATION STATE A POWER GENERATION TIME PERIOD | POWER GENERATION STATE B POWER GENERATION TIME PERIOD | ... | NUMBER OF ACTIVATIONS (NUMBER OF STOPS) | ... |
|---|---|---|---|---|---|---|
| FC SYSTEM 200A | 45 | 10 | 20 | ... | 20 | ... |
| FC SYSTEM 200B | 85 | 40 | 20 | ... | 50 | ... |
| FC SYSTEM 200C | 110 | 50 | 40 | ... | 60 | ... |
| ... | ... | ... | ... | ... | ... | ... |

| | TIME T1 DETERIORATION DEGREE | TIME T2 DETERIORATION DEGREE | TIME T3 DETERIORATION DEGREE | ... |
|---|---|---|---|---|
| FC SYSTEM 200A | 20 | 25 | 38 | ... |
| FC SYSTEM 200B | 30 | 30 | 40 | ... |
| FC SYSTEM 200C | 35 | 35 | 35 | ... |
| ... | ... | ... | ... | ... |

POWER SUPPLY CONTROL SYSTEM, POWER SUPPLY CONTROL METHOD, AND STORAGE MEDIUM

CROSS-REFERENCE TO RELATED APPLICATION

Priority is claimed on Japanese Patent Application No. 2020-097578, filed Jun. 4, 2020, the content of which is incorporated herein by reference.

BACKGROUND

Field of the Invention

The present invention relates to a power supply control system, a power supply control method, and a storage medium.

Description of Related Art

Conventionally, technology for controlling power generation of a fuel cell system on the basis of required electric power calculated on the basis of an amount of accelerator depression, a temperature of a secondary battery, and a stored amount of electric power is known as technology related to a fuel cell system mounted in a vehicle (for example, Japanese Unexamined Patent Application, First Publication No. 2016-103460).

SUMMARY

However, power supply control by a fuel cell system when a plurality of fuel cell systems are installed in a vehicle has not been taken into account. Therefore, the power supply efficiency of an entire fuel cell system may deteriorate according to a control state.

Aspects of the present invention have been made in consideration of such circumstances and an objective of the present invention is to provide a power supply control system, a power supply control method, and a storage medium capable of further improving the system efficiency of a fuel cell system.

A power supply control system, a power supply control method, and a storage medium according to the present invention adopt the following configurations.

(1): According to an aspect of the present invention, there is provided a power supply control system including: a state acquirer configured to acquire states of a plurality of fuel cell systems mounted in an electric device that operates using electric power; a power acquirer configured to acquire a required amount of electric power from the electric device; and a power generation controller configured to control power generation of one or more fuel cell systems among the plurality of fuel cell systems so that the required amount of electric power acquired by the power acquirer is satisfied on the basis of the state of each of the plurality of fuel cell systems acquired by the state acquirer.

(2): In the above-described aspect (1), the state acquirer acquires a deterioration degree in each of the plurality of fuel cell systems on the basis of at least one of a total power generation time period of each of the plurality of fuel cell systems, a power generation time period for each power generation state, the number of activations, and the number of stops.

(3): In the above-described aspect (2), the power generation controller causes the fuel cell system having a lower deterioration degree among the plurality of fuel cell systems to generate the electric power preferentially.

(4): In the above-described aspect (2), the power generation controller causes the fuel cell system having slower progress of deterioration based on a deterioration degree among the plurality of fuel cell systems to generate the electric power preferentially.

(5): In the above-described aspect (2), the power generation controller determines the number of fuel cell systems to be allowed to generate the electric power and an amount of electric power to be generated by each fuel cell system on the basis of the required amount of electric power and one or both of the deterioration degree and the power generation efficiency of each of the plurality of fuel cell systems acquired by the state acquirer.

(6): In the above-described aspect (2), the power generation controller causes one or more fuel cell systems among the plurality of fuel cell systems to generate the electric power so that a difference in deterioration degrees, total power generation time periods, the number of activations, or the number of stops of the plurality of fuel cell systems becomes small on the basis of the required amount of electric power.

(7): In the above-described aspect (1), when the number of fuel cell systems to be allowed to generate the electric power is increased on the basis of the required amount of electric power, the power generation controller causes the electric power to be generated so that an amount of electric power to be generated by the fuel cell system which is generating the electric power exceeds an amount of electric power to be generated serving as a reference for increasing the number of fuel cell systems.

(8): In the above-described aspect (1), the electric device is a moving object.

(9): According to another aspect of the present invention, there is provided a power supply control method including: acquiring, by a computer, states of a plurality of fuel cell systems mounted in an electric device that operates using electric power; acquiring, by the computer, a required amount of electric power from the electric device; and controlling, by the computer, power generation of one or more fuel cell systems among the plurality of fuel cell systems so that the acquired required amount of electric power is satisfied on the basis of the acquired state of each of the plurality of fuel cell systems.

(10): According to yet another aspect of the present invention, there is provided a computer-readable non-transitory storage medium storing a program for causing a computer to: acquire states of a plurality of fuel cell systems mounted in an electric device that operates using electric power; acquire a required amount of electric power from the electric device; and control power generation of one or more fuel cell systems among the plurality of fuel cell systems so that the acquired required amount of electric power is satisfied on the basis of the acquired state of each of the plurality of fuel cell systems.

According to the above-described aspects (1) to (10), it is possible to further improve the system efficiency of a fuel cell system.

DESCRIPTION OF EMBODIMENTS

Hereinafter, embodiments of a power supply control system, a power supply control method, and a storage medium of the present invention will be described with reference to the drawings. The power supply control system according to the embodiment is mounted in, for example, an electric device that operates using electric power. The electric device includes, for example, a moving object such as an electric vehicle, a railroad vehicle, a flying object (for example, an aircraft, a drone, or the like), a ship, and a robot. The electric device may include a stationary device (for example, a fuel cell system). Hereinafter, an example in which the power supply control system is mounted in an electric vehicle will be described. The electric vehicle is, for example, a fuel cell vehicle using electric power generated in a fuel cell as electric power for traveling or electric power for operating an in-vehicle device. Electric vehicles are automobiles such as two-wheeled vehicles, three-wheeled vehicles, and four-wheeled vehicles. The electric vehicle may be, for example, a large vehicle such as a bus or a truck that can be equipped with a plurality of fuel cell systems to be described below.

[Electric Vehicle]

Figure 1:
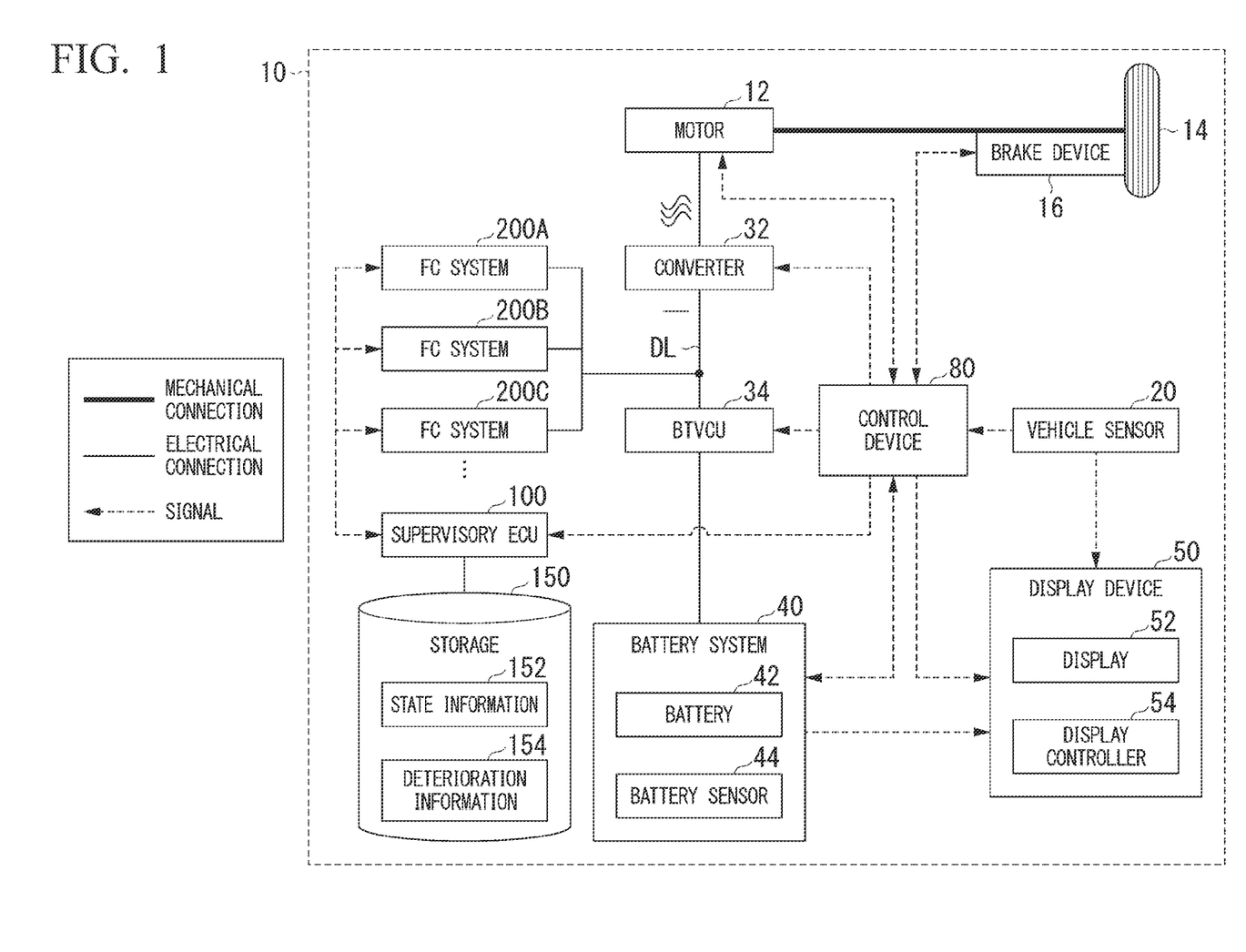
FIG. 1 is a diagram showing an example of a configuration of an electric vehicle equipped with a power supply control system according to an embodiment.

FIG. 1 is a diagram showing an example of a configuration of an electric vehicle equipped with the power supply control system according to the embodiment. As shown in FIG. 1, an electric vehicle 10 includes, for example, a motor 12, a drive wheel 14, a brake device 16, a vehicle sensor 20, a converter 32, a battery voltage control unit (BTVCU) 34, and a battery system (an example of a power storage device) 40, a display device 50, a control device 80, a supervisory electronic control unit (ECU) 100, a storage 150, and one or more fuel cell (FC) systems 200. Although a plurality of FC systems 200A, 200B, 200C, and the like are shown in the example of FIG. 1, they may be simply referred to as "FC systems 200" when they are not individually distinguished. A combination of the control device 80 and the supervisory ECU 100 is an example of a "power supply control system." The FC system 200 is an example of a "fuel cell system."

The motor 12 is, for example, a three-phase alternating current (AC) electric motor. The rotor of the motor 12 is connected to the drive wheel 14. The motor 12 outputs a driving force used for traveling of the electric vehicle 10 to the drive wheel 14 using at least one of electric power generated by the FC system 200 and electric power stored by the battery system 40. The motor 12 uses kinetic energy of the vehicle to generate electric power when the vehicle decelerates.

The brake device 16 includes, for example, a brake caliper, a cylinder configured to transfer hydraulic pressure to the brake caliper, and an electric motor configured to generate hydraulic pressure in the cylinder. The brake device 16 may include a mechanism configured to transfer the hydraulic pressure generated by the operation of the brake pedal to the cylinder via a master cylinder as a backup. The brake device 16 may be an electronically controlled hydraulic brake device configured to transfer the hydraulic pressure of the master cylinder to the cylinder.

The vehicle sensor 20 includes, for example, an accelerator opening degree sensor, a vehicle speed sensor, a brake depression amount sensor, and the like. The accelerator opening degree sensor is attached to an accelerator pedal which is an example of an operation element for receiving an acceleration instruction from a driver, detects an amount of operation of the accelerator pedal, and outputs the detected amount of operation as an accelerator opening degree to the control device 80. The vehicle speed sensor includes, for example, a wheel speed sensor attached to each wheel and a speed calculator and integrates wheel speeds detected by wheel speed sensors to derive the speed of the vehicle (a vehicle speed) and output the derived speed to the control device 80 and the display device 50. The brake depression amount sensor is attached to the brake pedal, detects an amount of operation of the brake pedal, and outputs the detected amount of operation as an amount of brake depression to the control device 80.

The vehicle sensor 20 may include an acceleration sensor configured to detect the acceleration of the electric vehicle 10, a yaw rate sensor configured to detect the angular speed around a vertical axis, a direction sensor configured to detect the direction of the electric vehicle 10, and the like. The vehicle sensor 20 may include a location sensor configured to detect a location of the electric vehicle 10. The location sensor acquires location information of the electric vehicle 10 from, for example, a global navigation satellite system (GNSS) receiver mounted in the electric vehicle 10 or a global positioning system (GPS) device. The vehicle sensor 20 may include a temperature sensor configured to measure a temperature of the FC system 200. Various types of information detected by the vehicle sensor 20 are output to the control device 80.

The converter 32 is, for example, an AC-direct current (DC) converter. A DC side terminal of the converter 32 is connected to a DC link DL. The battery system 40 is connected to the DC link DL via the BTVCU 34. The converter 32 converts an AC voltage obtained through power generation by the motor 12 into a DC voltage and outputs the DC voltage to the DC link DL.

The BTVCU 34 is, for example, a step-up DC-DC converter. The BTVCU 34 boosts the DC voltage supplied from the battery system 40 and outputs the boosted DC voltage to the DC link DL. The BTVCU 34 outputs a regenerative voltage supplied from the motor 12 or an FC voltage supplied from the FC system 200 to the battery system 40.

The battery system 40 includes, for example, a battery 42 and a battery sensor 44. The battery 42 is, for example, a secondary battery such as a lithium-ion battery. For example, the battery 42 stores the electric power generated by the motor 12 or the FC system 200 and is discharged for the traveling of the electric vehicle 10 or for the operation of the in-vehicle device.

The battery sensor 44 includes, for example, an electric current sensor, a voltage sensor, and a temperature sensor. The battery sensor 44 detects, for example, an electric current value, a voltage value, and a temperature of the battery 42. The battery sensor 44 outputs the electric current value, the voltage value, the temperature, and the like that have been detected to the control device 80.

The battery system 40 may be connected to, for example, an external charging facility to charge the battery 42 with the electric power supplied from a charging/discharging device.

The display device 50 includes, for example, a display 52 and a display controller 54. The display 52 is, for example, a display or a head-up display (HUD) provided within a meter or on an instrument panel. The display 52 displays various types of information according to control of the display controller 54. The display controller 54 causes the display 52 to display an image based on information output by the battery system 40 or information output by the FC system 200. The display controller 54 causes the display 52 to display an image based on information output by the vehicle sensor 20 or the control device 80. The display controller 54 causes the display 52 to display an image indicating the vehicle speed or the like output by the vehicle sensor 20. The display device 50 may include a speaker configured to output a sound and may output a sound, an alarm, or the like associated with an image displayed on the display 52.

The control device 80 controls the traveling of the electric vehicle 10, the operation of the in-vehicle device, and the like. For example, the control device 80 controls the supply of electric power with which the battery system 40 is charged, the electric power generated by the FC system 200, and the like in accordance with the electric power required from the electric vehicle 10. The required electric power from the electric vehicle 10 is, for example, total load power required for the load of the electric vehicle 10 to be driven or operated. The load includes, for example, auxiliary equipment such as the motor 12, the brake device 16, the vehicle sensor 20, the display device 50, and other in-vehicle devices. The control device 80 may perform control of the traveling of the electric vehicle 10 and the like. The details of the function of the control device 80 will be described below.

The supervisory ECU 100 comprehensively controls an amount of electric power to be generated by each of the plurality of FC systems (the FC systems 200A, 200B, 200C, and the like) on the basis of, for example, control information from the control device 80 and the like. Details of the function of the supervisory ECU 100 will be described below.

The storage 150 is implemented by, for example, a hard disk drive (HDD), a flash memory, an electrically erasable programmable read only memory (EEPROM), a read only memory (ROM), a random access memory (RAM), or the like. For example, the storage 150 stores state information 152, deterioration information 154, a program, and various types of other information. The content of the state information 152 and the deterioration information 154 will be described below.

For example, the FC system 200 includes a fuel cell. The fuel cell is, for example, a battery configured to generate electric power when fuel of an anode reacts with an oxidant of a cathode. For example, the fuel cell generates electric power when hydrogen contained as fuel in a fuel gas reacts with oxygen contained as an oxidant in air. The FC system 200 performs power generation of an amount of electric power to be generated indicated in an instruction according to control of the supervisory ECU 100 and outputs electric power, which has been generated, to, for example, a DC link DL between the converter 32 and the BTVCU 34 to supply the electric power. Thereby, the electric power supplied by the FC system 200 is supplied to the motor 12 via the converter 32 or to the battery system 40 via the BTVCU 34 according to the control of the control device 80 or the like or stored in the battery 42, or the electric power required for other auxiliary equipment or the like is supplied.

[FC System]

Figure 2:
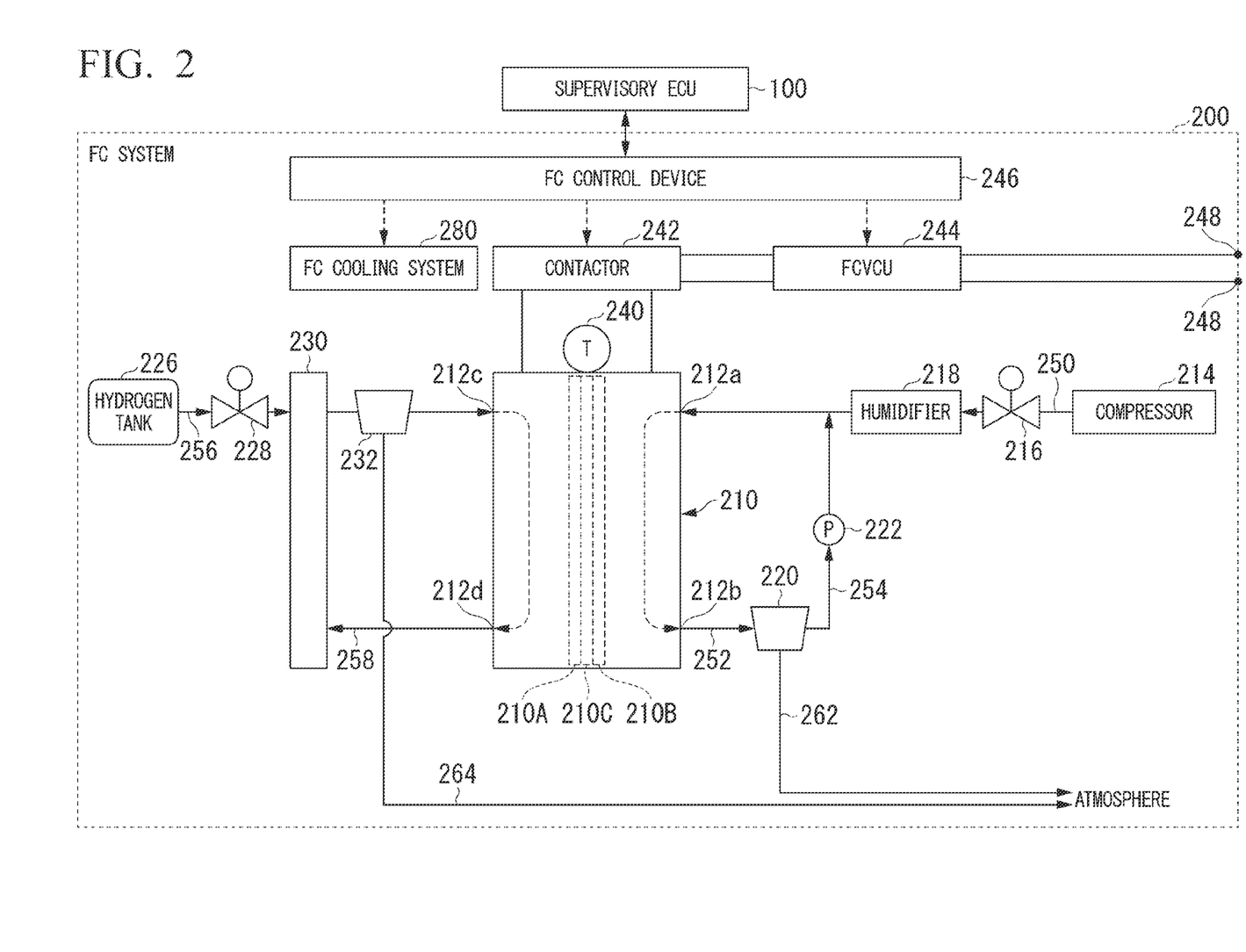
FIG. 2 is a diagram showing an example of a configuration of a fuel cell (FC) system according to the embodiment.

Next, the FC system 200 will be described specifically. FIG. 2 is a diagram showing an example of a configuration of the FC system 200 according to the embodiment. The configuration shown in FIG. 2 can be applied to each of a plurality of FC systems 200 mounted in the electric vehicle 10. The FC system 200 according to the present embodiment is not limited to the following configuration and may have, for example, any configuration as long as it is a system configuration in which electric power is generated using an anode and a cathode. The FC system 200 shown in FIG. 2 includes, for example, an FC stack 210, a compressor 214, a sealing inlet valve 216, a humidifier 218, a gas-liquid separator 220, an exhaust gas circulation pump (P) 222, a hydrogen tank 226, a hydrogen supply valve 228, a hydrogen circulator 230, a gas-liquid separator 232, a temperature sensor (T) 240, a contactor 242, a fuel cell voltage control unit (FCVCU) 244, an FC control device 246, and an FC cooling system 280.

The FC stack 210 includes a laminate (not shown) in which a plurality of fuel cells are laminated, and a pair of end plates (not shown) configured to sandwich the laminate from both sides in a lamination direction. The fuel cell includes a membrane electrode assembly (MEA) and a pair of separators configured to sandwich the membrane electrode assembly from both sides in a bonding direction. The membrane electrode assembly includes, for example, an anode 210A made of an anode catalyst and a gas diffusion layer, a cathode 210B made of a cathode catalyst and a gas diffusion layer, and a solid polymer electrolyte membrane 210C made of a cation-exchange membrane or the like sandwiched between the anode 210A and the cathode 210B from both sides in a thickness direction.

A fuel gas containing hydrogen as fuel is supplied from the hydrogen tank 226 to the anode 210A. Air, which is an oxidant gas (a reaction gas) containing oxygen as an oxidant, is supplied from the compressor 214 to the cathode 210B. The hydrogen supplied to the anode 210A is ionized by a catalytic reaction on an anode catalyst and hydrogen ions move to the cathode 210B via the solid polymer electrolyte membrane 210C that is appropriately humidified. Electrons generated by the movement of hydrogen ions can be taken out to an external circuit (the FCVCU 244 or the like) as a DC. The hydrogen ions that have moved from the anode 210A onto a cathode catalyst of the cathode 210B react with the oxygen supplied to the cathode 210B and the electrons on the cathode catalyst to generate water.

The compressor 214 includes a motor and the like that are driven and controlled by the FC control device 246 and pumps an oxidant gas to the fuel cell by taking in and compressing air from the outside using the driving force of the motor and feeding the compressed air to the oxidant gas supply path 250 connected to the cathode 210B.

The sealing inlet valve 216 is provided in the oxidant gas supply path 250, which connects the compressor 214 and a cathode supply port 212a capable of supplying air to the cathode 210B of the FC stack 210 and is opened and closed according to control of the FC control device 246.

The humidifier 218 humidifies the air fed from the compressor 214 to the oxidant gas supply path 250. For example, the humidifier 218 includes a water permeable membrane such as a hollow fiber membrane and adds moisture to the air by causing the air from the compressor 214 to be brought into contact with the moisture via the water permeable membrane.

The gas-liquid separator 220 causes a cathode exhaust gas, which is not consumed by the cathode 210B and is expelled from a cathode discharge port 212b to an oxidant gas discharge path 252 and the liquid water, to be expelled into the atmosphere via the cathode exhaust path 262. The gas-liquid separator 220 may separate the cathode exhaust gas expelled to the oxidant gas discharge path 252 from the liquid water and only the separated cathode exhaust gas may be allowed to flow into an exhaust gas recirculation path 254.

The exhaust gas circulation pump 222 is provided in the exhaust gas recirculation path 254, mixes the cathode exhaust gas that has flowed from the gas-liquid separator 220 to the exhaust gas recirculation path 254 with the air flowing through the oxidant gas supply path 250 from the sealing inlet valve 216 to the cathode supply port 212a, and supplies a mix of the cathode exhaust gas and the air to the cathode 210B again.

The hydrogen tank 226 stores hydrogen in a compressed state. The hydrogen supply valve 228 is provided in a fuel gas supply path 256 that connects the hydrogen tank 226 and an anode supply port 212c capable of supplying hydrogen to the anode 210A of the FC stack 210. When the hydrogen supply valve 228 is opened according to the control of the FC control device 246, the hydrogen stored in the hydrogen tank 226 is supplied to the fuel gas supply path 256.

The hydrogen circulator 230 is, for example, a pump that circulates and supplies a fuel gas to the fuel cell. For example, the hydrogen circulator 230 causes the anode exhaust gas, which is not consumed by the anode 210A and is expelled from an anode discharge port 212d to a fuel gas discharge path 258, to circulate to the fuel gas supply path 256 flowing into the gas-liquid separator 232.

The gas-liquid separator 232 separates the anodic exhaust gas and the liquid water that circulate from the fuel gas discharge path 258 to the fuel gas supply path 256 according to the action of the hydrogen circulator 230. The gas-liquid separator 232 supplies the anode exhaust gas separated from the liquid water to the anode supply port 212c of the FC stack 210. The liquid water expelled to the gas-liquid separator 232 is expelled into the atmosphere through a drain pipe 264.

The temperature sensor 240 detects temperatures of the anode 210A and the cathode 210B of the FC stack 210 and outputs a detection signal (temperature information) to the FC control device 246.

The contactor 242 is provided between the anode 210A and the cathode 210B of the FC stack 210 and the FCVCU 244. The contactor 242 electrically connects or disconnects the FC stack 210 and the FCVCU 244 on the basis of the control from the FC control device 246.

The FCVCU 244 is, for example, a step-up DC-DC converter. The FCVCU 244 is disposed between the anode 110A and the cathode 210B of the FC stack 210 and an electrical load via the contactor 242. The FCVCU 244 boosts the voltage of an output terminal 248 connected to the electric load side to a target voltage determined by the FC control device 246. For example, the FCVCU 244 boosts the voltage output from the FC stack 210 to the target voltage and outputs the voltage to the output terminal 248.

The FC control device 246 controls the start and end of power generation in the FC system 200, the amount of electric power to be generated, and the like according to the power generation control by the supervisory ECU 100. The FC control device 246 controls the temperature adjustment of the FC system 200 using the FC cooling system 280. The FC control device 246 may be replaced with a control device such as an FC-ECU. Also, the FC control device 246 may perform power supply control of the electric vehicle 10 in cooperation with the supervisory ECU 100 or the control device 80.

The FC cooling system 280 cools the FC system 200 according to the control by the FC control device 246, for example, when the temperature of the FC stack 210 detected by the temperature sensor 240 is greater than or equal to a threshold value. For example, the FC cooling system 280 decreases the temperature of the FC stack 210 by circulating a refrigerant to the flow path provided within the FC stack 210 and expelling the heat of the FC stack 210. The FC cooling system 280 may perform control for heating or cooling the FC stack 210 so that the temperature from the temperature sensor 240 is maintained in a predetermined temperature range when the FC system 200 is generating electric power.

[Control Device]

Figure 3:
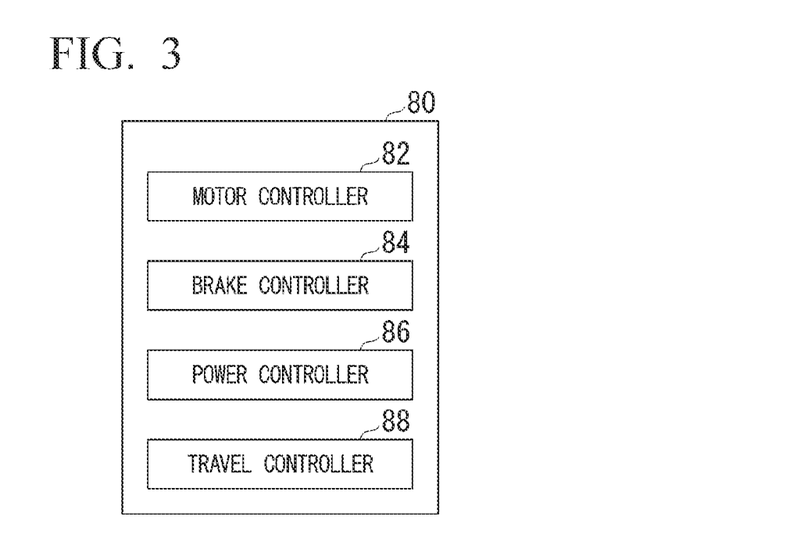
FIG. 3 is a diagram showing an example of a configuration of a control device.

FIG. 3 is a diagram showing an example of a configuration of the control device 80. The control device 80 includes, for example, a motor controller 82, a brake controller 84, a power controller 86, and a travel controller 88. Each of the motor controller 82, the brake controller 84, the power controller 86, and the travel controller 88 is implemented, for example, by a hardware processor such as a central processing unit (CPU) executing a program (software). Some or all of these components may be implemented by hardware (a circuit including circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the electric vehicle 10 or may be stored in a removable storage medium such as a DVD or a CD-ROM and installed in the HDD or the flash memory of the electric vehicle 10 when the storage medium (the non-transitory storage medium) is mounted in a drive device. The storage device described above is, for example, the storage 150.

The motor controller 82 calculates a driving force required for the motor 12 on the basis of the output of the vehicle sensor 20 and controls the motor 12 so that the calculated driving force is output.

The brake controller 84 calculates a braking force required for the brake device 16 on the basis of the output of the vehicle sensor 20 and controls the brake device 16 so that the calculated braking force is output.

The power controller 86 calculates a required amount of electric power to be generated by the battery system 40 and the FC system 200 on the basis of the output of the vehicle sensor 20. For example, the power controller 86 calculates a torque to be output by the motor 12 on the basis of an accelerator opening degree and a vehicle speed and calculates the required amount of electric power by calculating a sum of the drive shaft load power obtained from the torque and the rotational speed of the motor 12 and the electric power required by the auxiliary equipment or the like. The power controller 86 manages a charging state (a storage state) of the battery system 40. For example, the power controller 86 calculates a state of charge (SOC) (a charging rate) of the battery 42 on the basis of the output of the battery sensor 44. For example, when the SOC of the battery 42 is less than a predetermined value, the power controller 86 executes control for charging the battery 42 according to power generation by the FC system 200 or causes the display device 50 to output information for prompting the occupant to charge the battery 42 according to the supply of electric power from an external charging facility. The power controller 86 may stop the charging control when the SOC of the battery 42 is greater than the predetermined value or may perform control for causing the surplus power generated by the FC system 200 to be consumed by the auxiliary equipment or the like.

The travel controller 88 executes driving control for the electric vehicle 10 on the basis of information acquired by, for example, the vehicle sensor 20. The travel controller 88 may execute driving control of the electric vehicle 10 on the basis of map information or information acquired from a monitoring unit (not shown) in addition to the information acquired by the vehicle sensor 20. For example, the monitoring unit includes a camera for imaging a space outside the electric vehicle 10, a radar or a light detection and ranging (LIDAR) sensor having a detection range outside the electric vehicle 10, a physical object recognition device for performing a sensor fusion process on the basis of outputs thereof, and the like. The monitoring unit estimates types of physical objects (particularly, vehicles, pedestrians, and bicycles) present around the electric vehicle 10 and outputs the estimated types of physical objects together with information of positions and speeds thereof to the travel controller 88. For example, the driving control is to cause the electric vehicle 10 to travel by controlling one or both of steering and acceleration/deceleration of the electric vehicle 10. The driving control includes, for example, driving assistance control of an advanced driver assistance system (ADAS) or the like. The ADAS includes, for example, a lane keeping assistance system (LKAS), an adaptive cruise control system (ACC), a collision mitigation brake system (CMBS), and the like.

[Supervisory ECU]

Figure 4:
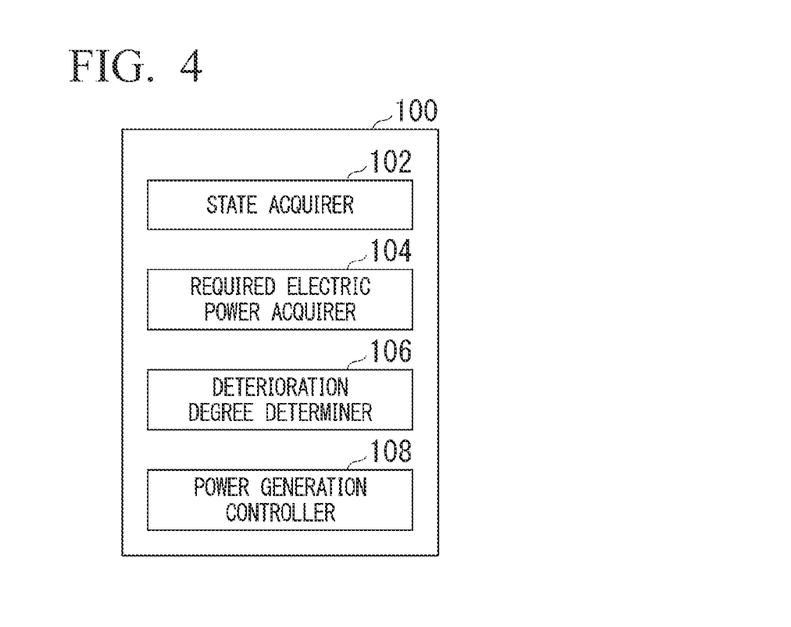
FIG. 4 is a diagram showing an example of the configuration of a supervisory ECU.

FIG. 4 is a diagram showing an example of the configuration of the supervisory ECU 100. The supervisory ECU 100 includes, for example, a state acquirer 102, a required electric power acquirer 104, a deterioration degree determiner 106, and a power generation controller 108. Each of the state acquirer 102, the required electric power acquirer 104, the deterioration degree determiner 106, and the power generation controller 108 is implemented, for example, by a hardware processor such as a CPU executing a program (software). Some or all of these components may be implemented by hardware (a circuit including circuitry) such as an LSI circuit, an ASIC, an FPGA, or a GPU or may be implemented by software and hardware in cooperation. The program may be pre-stored in a storage device (a storage device including a non-transitory storage medium) such as an HDD or a flash memory of the electric vehicle 10 or may be stored in a removable storage medium such as a DVD or a CD-ROM and installed in the HDD or the flash memory of the electric vehicle 10 when the storage medium (the non-transitory storage medium) is mounted in a drive device. The storage device described above is, for example, the storage 150. The required electric power acquirer 104 is an example of a "power acquirer."

The state acquirer 102 acquires the states of the plurality of FC systems 200 mounted on the electric vehicle 10 at predetermined timings or intervals. The state of the FC system 200 includes, for example, at least one of a total power generation time period, a power generation time period for each power generation state, and the number of times the FC system is activated (or stopped). The state acquirer 102 stores the acquired state of each FC system in the state information 152 of the storage 150.

Figure 5:
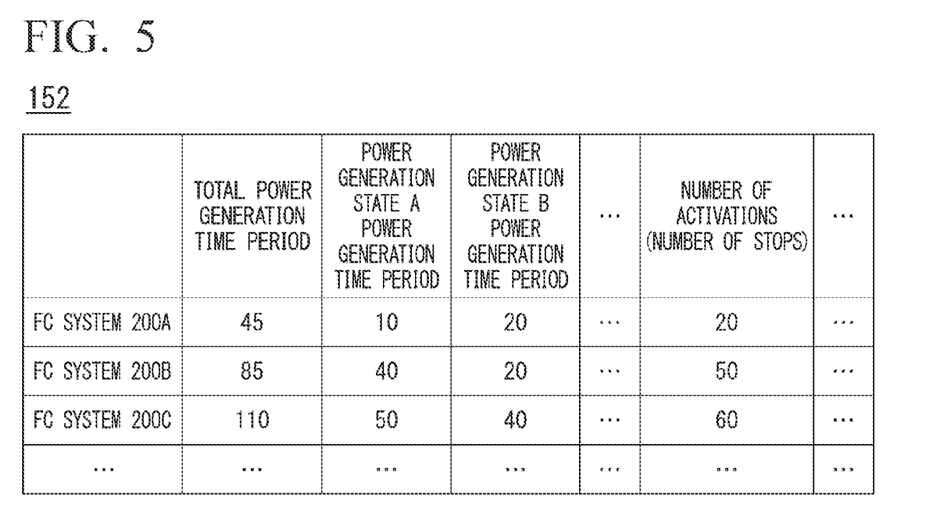
FIG. 5 is a diagram for describing content of state information.

FIG. 5 is a diagram for describing content of the state information 152. The state information 152 is information in which the total power generation time period, the power generation time period for each power generation state, and the number of activations (or the number of stops) are associated with each FC system mounted in the electric vehicle 10. The power generation states A, B, and the like indicate that temperatures, load regions, or the like of the FC systems are different from each other. For example, the load region is a region distinguished by, for example, the range of required electric power, a genre of load (for example, a traveling system, an in-vehicle device, or the like), the number of FC systems at the time of power generation, and the like.

The required electric power acquirer 104 acquires the required amount of electric power from the electric vehicle 10. For example, the required electric power acquirer 104 acquires a required amount of electric power to be generated by a plurality of FC systems 200 according to the control device 80 (i.e., an amount of electric power obtained by subtracting the amount of electric power supplied by the battery system 40 from a required amount of electric power necessary for the entire electric vehicle).

The deterioration degree determiner 106 determines a deterioration degree for each of the plurality of FC systems on the basis of at least one of the total power generation time period of each of the plurality of FC systems, the power generation time period for each power generation state, the number of activations, and the number of stops. For example, the deterioration degree determiner 106 determines the deterioration degree for each FC system at a predetermined timing or interval and stores a determination result in the deterioration information 154 of the storage 150.

Figure 6:
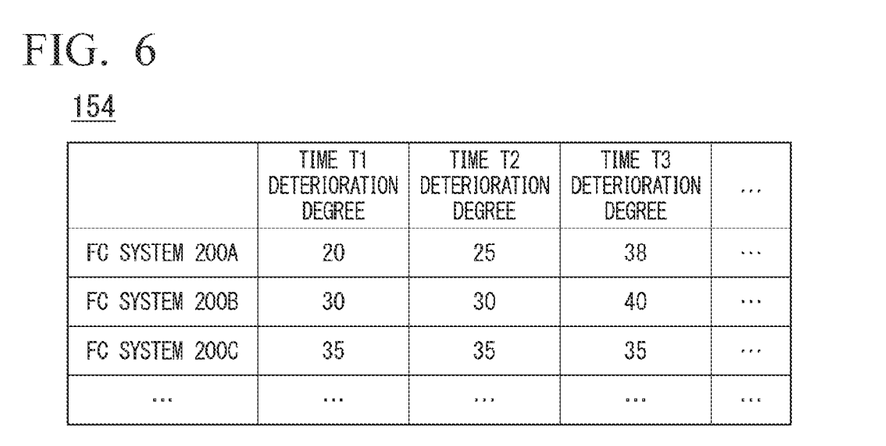
FIG. 6 is a diagram for describing content of deterioration information.

FIG. 6 is a diagram for describing content of the deterioration information 154. The deterioration information 154 is information in which the deterioration degree at the determination time is associated with each FC system mounted in the electric vehicle 10. In the example of FIG. 6, it is assumed that the time progresses in the order of times T1, T2, and T3. In the example of FIG. 6, it is assumed that the deterioration degree increases as the numerical value increases. The deterioration degree may be an index value indicating the degree such as a letter (for example, A, B, C, or the like) instead of the numerical value.

For example, the deterioration degree determiner 106 increases the deterioration degree as the total power generation time period increases. A weight for increasing the deterioration degree may be changed in accordance with the power generation state during the power generation time period. In addition to (or instead of) the determination described above, the deterioration degree determiner 106 may increase the deterioration degree as the number of times the FC system 200 is activated or stopped increases. The deterioration degree determiner 106 may preset a table in which the deterioration degree is associated with the total power generation time period and the number of activations (or the number of stops) and determine the deterioration degree associated with the total power generation time period and the number of activations using the table. The deterioration degree determiner 106 may preset a function or a learned model in which the total power generation time period or the number of activations (or the number of stops) is designated as an input value and the deterioration degree is designated as an output value and determine the deterioration degree using the function or the learned model.

The power generation controller 108 controls the power generation of one or more FC systems among the plurality of FC systems so that the required electric power from the electric vehicle 10 acquired by the required electric power acquirer 104 is satisfied. For example, the power generation controller 108 controls the power generation of one or more FC systems among the plurality of FC systems on the basis of system efficiencies of the plurality of FC systems. The system efficiency is, for example, efficiency based on the lifespan of the entire FC system, efficiency based on power generation (or power supply) for each system, efficiency based on another preset index value, or the like.

Figure 7:
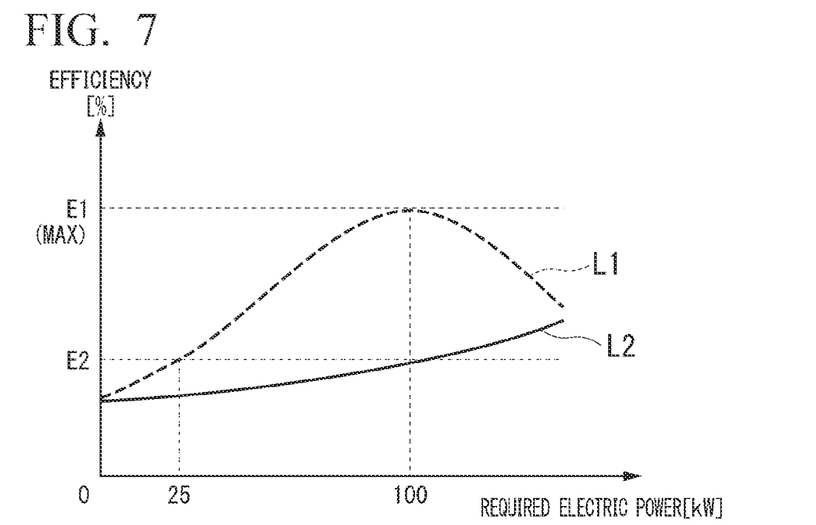
FIG. 7 is a diagram showing a relationship between the number of FC systems and power generation efficiency.

FIG. 7 is a diagram showing a relationship between the number of FC systems and power generation efficiency. In the example of FIG. 7, the vertical axis represents power generation efficiency [%] and the horizontal axis represents required electric power [kW]. Hereinafter, it is assumed that the FC system has the optimum efficiency when one FC system generates an electric power of 100 [kW] for a predetermined time period. The amount of electric power to be generated associated with optimum efficiency is arbitrarily set in accordance with, for example, a type, performance, or scale of the FC system. For example, when the required electric power is 100 [kW], the FC system 200A performs power generation at an efficiency of E1 [%] which is the optimum efficiency (efficiency MAX) as shown in a curve L1 of FIG. 7 if only one FC system (for example, the FC system 200A) is allowed to generate the electric power.

On the other hand, when a plurality of FC systems are used, the efficiency of each FC system becomes E2 [%], which is smaller than E1 as shown in a curve L2 of FIG. 7, and the system efficiency deteriorates in a case in which control is performed so that the sum of amounts of electric power to be generated is 100 [kW] if each FC system is allowed to simply generate electric power with an identical or similar amount of electric power to be generated. Thus, the power generation controller 108 determines the number of FC systems for generating electric power and an amount of electric power to be generated (an amount of supply to the load) on the basis of a state and a deterioration degree of each FC system and the like so that the plurality of FC systems have the optimum efficiency as a whole in accordance with the required electric power.

For example, when an FC system whose power generation is controlled among a plurality of FC systems is determined, the power generation controller 108 determines priority on the basis of the deterioration degree of each FC system and performs control so that electric power is generated from an FC system having the highest priority that has been determined. In this case, the power generation controller 108 causes the FC system having a lower deterioration degree among the plurality of FC systems to generate electric power preferentially with reference to the deterioration information 154 stored in the storage 150. Thereby, it is possible to generate an amount of electric power that is greater than or equal to the required electric power more efficiently.

For example, the power generation controller 108 may cause the system having slower deterioration progress to generate electric power preferentially on the basis of a progress state of deterioration according to the elapse of time of each FC system with reference to the deterioration information 154 stored in the storage 150. For example, a progress state of deterioration (for example, a state in which the progress is faster or slower than that of another FC system or the like) is acquired from the transition of the deterioration degree for each point in time included in the deterioration information 154 and the FC system having the progress of the slowest deterioration as compared with other FC systems is allowed to generate electric power preferentially. Thereby, the lifespan of the entire FC system can be extended. Extending the lifespan of the entire FC system is an example in which system efficiency is improved.

The power generation controller 108 may control the FC system that is allowed to generate electric power so that a difference in the deterioration degree of each of the plurality of FC systems becomes small Thereby, a deterioration degree difference from another FC system can be reduced, the deterioration degree can be made uniform, and consequently the lifespan of the entire FC system can be extended. The power generation controller 108 may determine the FC system whose power generation is controlled on the basis of a comparison result (for example, a difference) of the deterioration degree of each of the plurality of FC systems.

Instead of the above-described control, the power generation controller 108 may control the FC system to be allowed to generate electric power so that a difference in the total power generation time period, a difference in the number of activations, or a difference in the number of stops of each of the plurality of FC systems becomes small. In this case, the power generation controller 108 causes the FC system having a shorter total power generation time period or the smaller number of activations or stops than the other FC systems to generate electric power preferentially with reference to the state information 152. Thereby, the lifespan of the entire FC system can be extended.

The power generation controller 108 may determine the number of FC systems to be allowed to generate electric power and an amount of electric power to be generated by each FC system on the basis of the required amount of electric power and one or both of the deterioration degree and the power generation efficiency of each of the plurality of FC systems acquired by the state acquirer 102.

Figure 8:
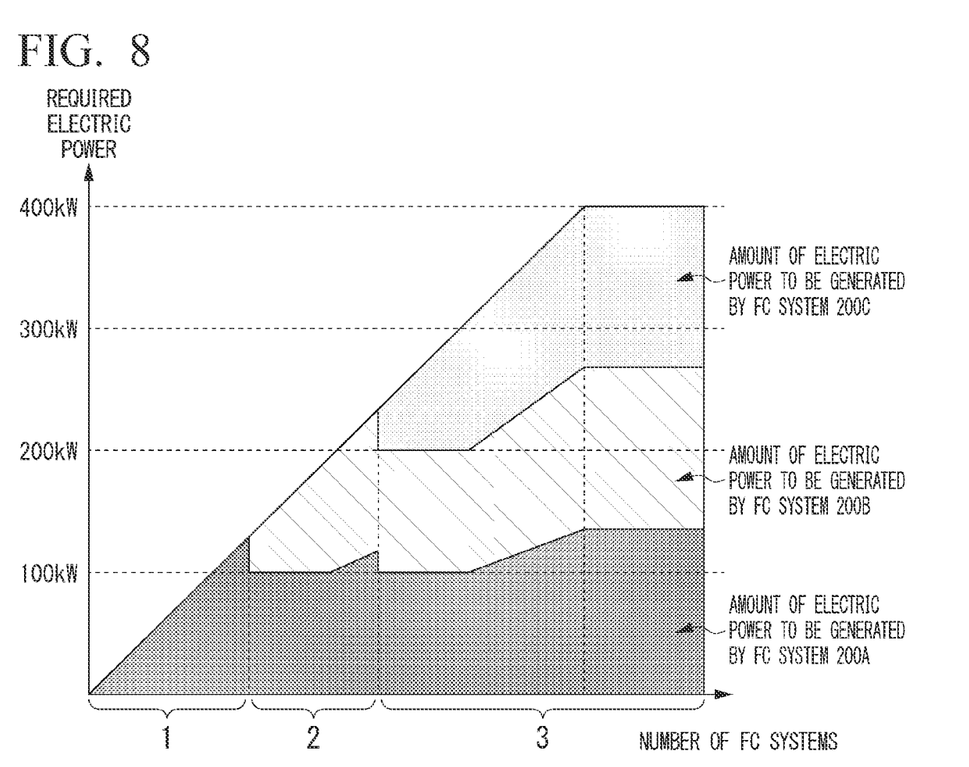
FIG. 8 is a diagram for describing that the number of FC systems and an amount of electric power to be generated by each FC system are determined on the basis of required electric power.

FIG. 8 is a diagram for describing that the number of FC systems and the amount of electric power to be generated by each FC system are determined on the basis of the required electric power. In the example of FIG. 8, the vertical axis represents the required electric power and the horizontal axis represents the number of FC systems. In the example of FIG. 8, it is assumed that the electric vehicle 10 is equipped with three FC systems 200A, 200B, and 200C.

The power generation controller 108 controls the power generation of one or more FC systems among the plurality of FC systems 200A, 200B, and 200C mounted in the electric vehicle 10 on the basis of a magnitude of the required electric power. For example, the power generation controller 108 adjusts the amount of electric power to be generated by each FC system so that the FC system that is generating electric power can generate electric power in a state close to the optimum efficiency. Specifically, the power generation controller 108 controls the amount of electric power to be generated by the FC system so that the amount of electric power to be generated is close to 100 [kW] (optimum efficiency). Therefore, electric power is generated by one FC system when the required electric power acquired by the required electric power acquirer 104 is less than 100 [kW], electric power is generated by two FC systems when the required electric power acquired by the required electric power acquirer 104 is greater than or equal to 100 [kW] and less than 200 [kw], and electric power is generated by three FC systems when the required electric power acquired by the required electric power acquirer 104 is greater than or equal to 200 [kw].

The power generation controller 108 may set an upper limit value of the required electric power associated with the optimum efficiency in accordance with the number of FC systems mounted in the electric vehicle 10. In the example of FIG. 8, 400 [kW] is set as the upper limit value of the required electric power. By setting the upper limit value of the amount of electric power to be generated, it is possible to limit the high-load power generation of the FC system and limit the system deterioration.

When the number of FC systems to be allowed to generate electric power is increased, the power generation controller 108 may cause electric power to be generated by an excessive amount of electric power obtained by adding a predetermined amount to the preset amount of electric power to be generated (100 [kW]) with respect to the amount of electric power to be generated by the FC system which is generating electric power. An amount of electric power to be generated associated with the optimum efficiency is an example of an amount of electric power to be generated serving as a reference for increasing or decreasing the number of fuel cell systems. That is, the power generation controller 108 performs switching of the number of FC systems to be allowed to generate electric power so that more optimum efficiency is provided in the entire system on the basis of the deterioration of the efficiency of the FC system during power generation when the load is high and the increased improvement of the efficiency of the FC system when the load is low. Thereby, because it is possible to cause the increased amount of electric power to be generated by the FC system to be generated from a certain amount of electric power, it is possible to limit the deterioration of the increased power generation efficiency of the FC system.

When the number of FC systems to be allowed to generate electric power is increased according to a magnitude of the required electric power, the power generation controller 108 causes the amount of electric power to be generated by the FC system that has been generating electric power before the increase to be maintained in a state in which the amount of electric power to be generated by the FC system is close to the amount of electric power to be generated associated with the optimum efficiency (100 [kW]).

In the example of FIG. 8, the power generation controller 108 causes electric power to be generated using only the FC system 200A when the required electric power is less than 100 [kW], which is an amount of electric power of the optimum efficiency. The power generation by the FC system 200A is continued until the amount of electric power becomes a predetermined excessive amount of electric power or more when the required electric power is greater than or equal to 100 [kW] and the power generation by the FC system 200B in addition to the FC system 200A is performed when the required electric power becomes greater than or equal to the excessive amount of electric power. When the power generation by the FC system 200B has been started, the power generation controller 108 performs control so that the amount of electric power to be generated by the FC system 200A is close to the optimum efficiency of 100 [kW] and causes the amount of electric power to be generated by the FC system 200B to be increased. Thereby, the power generation efficiency of the FC system 200A can be continued in an optimum state and the control load can be limited as compared with a case in which the two FC systems 200A and 200B are allowed to generate the same amount of electric power away from the optimum efficiency. Deterioration due to a large change in the amount of electric power generated by the FC system 200A can also be limited. The predetermined excessive amount of electric power may be set to, for example, a minimum amount of electric power capable of being stably generated by the FC system 200B. Thereby, a change in the output of the FC system can be limited before and after the FC system 200B is activated.

When the required electric power is greater than or equal to 200 [kW], the power generation controller 108 does not immediately activate the FC system 200C and causes an amount of electric power of each of the FC system 200A and the FC system 200B to be increased from an amount of electric power associated with the optimum efficiency until a total amount of electric power to be generated by the FC system 200A and the FC system 200B reaches a predetermined excessive amount of electric power. Subsequently, power generation by the FC system 200C is started. When the power generation by the FC system 200C is started, the power generation controller 108 performs control so that the amounts of electric power to be generated by the FC systems 200A and 200B are close to 100 [kW] and causes the amount of electric power to be generated by only the FC system 200C to be increased. When the required electric power exceeds 300 [kW], the amount of electric power to be generated by each of the FC systems 200A to 200C is increased to the upper limit value 400 [kW] of the required electric power.

Figure 9:
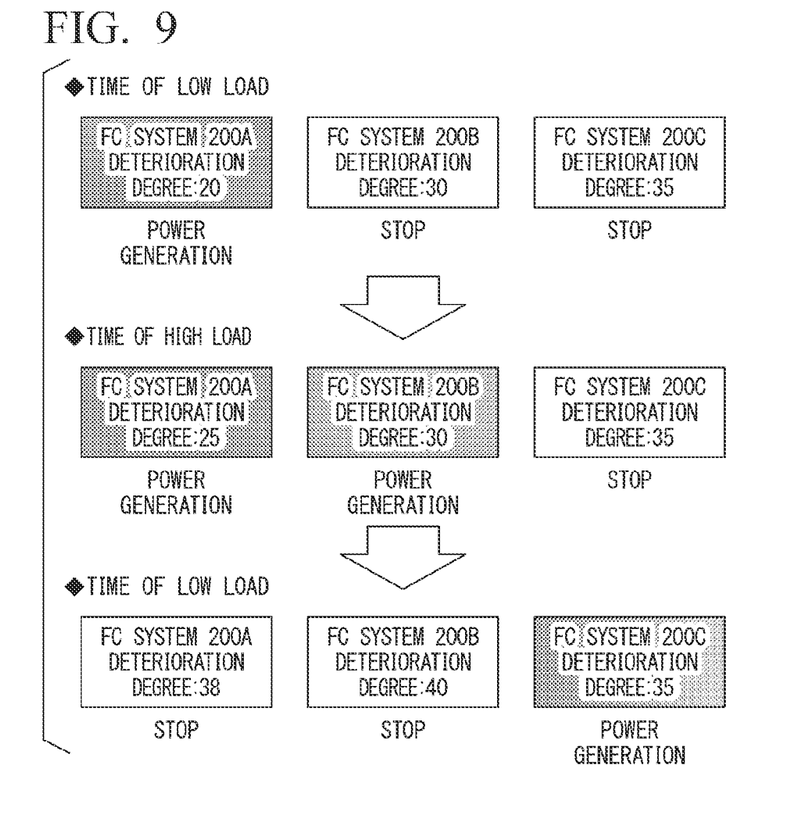
FIG. 9 is a diagram for describing that the priority of the FC system allowed to generate electric power changes on the basis of a progress state of deterioration.

The power generation controller 108 may determine a power generation system which is allowed to generate electric power on the basis of a progress state of deterioration in each FC system. FIG. 9 is a diagram for describing that the priority of the FC system allowed to generate electric power changes on the basis of the progress state of deterioration. In the example of FIG. 9, a relationship between the deterioration degrees of the plurality of FC systems 200A to 200C at times T1, T2, and T3 and power generation control is shown.

For example, in the scene of time T1, when the required electric power of a low load (for example, a load of less than 100 [kW]) has been acquired by the required electric power acquirer 104, the power generation controller 108 determines one FC system having the lowest deterioration degree among the FC systems 200A to 200C at the current point in time as an FC system of a power generation target with reference to the deterioration information 154. In the example of FIG. 9, at the point in time which is time T1, the deterioration degree of the FC system 200A is "10," the deterioration degree of the FC system 200B is "20," and the deterioration degree of the FC system 200C is "35." Therefore, the power generation controller 108 determines the FC system 200A among the FC systems 200A to 200C as an FC system allowed to generate electric power and causes the determined FC system 200A to generate electric power so that the amount of electric power to be generated by the FC system 200A is greater than or equal to the required amount of electric power.

For example, in the scene of time T2, when the required electric power of a high load (for example, a load of 100 [kW] or more and less than 200 [kW]) has been acquired by the required electric power acquirer 104, the power generation controller 108 determines two FC systems from the FC system having the lowest deterioration degree at the current point in time among the FC systems 200A to 200C with reference to the deterioration information 154. In the example of FIG. 9, at a point in time which is time T2, the deterioration degree of the FC system 200A is "25," the deterioration degree of the FC system 200B is "30," and the deterioration degree of the FC system 200C is "35." Therefore, the power generation controller 108 determines the FC systems 200A and 200B among the FC systems 200A to 200C as FC systems to be allowed to generate electric power and performs power generation control so that a total value of amounts of electric power to be generated by the FC systems 200A and 200B is greater than or equal to the required amount of electric power. At the point in time which is time T2, the power generation control of the FC system 200B is added in addition to the FC system 200A whose power generation is already in progress. Therefore, the power generation controller 108 performs control so that the amount of electric power to be generated by the FC system 200A is close to the optimum power generation efficiency and performs control so that the FC system 200B is allowed to generate a difference amount of electric power between the amount of electric power to be generated and the required amount of electric power.

For example, in the scene of time T3, when the required electric power of a low load (for example, a load of less than 100 [kW]) has been acquired by the required electric power acquirer 104, the power generation controller 108 determines one FC system having the lowest deterioration degree among the FC systems 200A to 200C at the current point in time with reference to the deterioration information 154. In the example of FIG. 9, at the point in time which is time T3, the deterioration degree of the FC system 200A is "38," the deterioration degree of the FC system 200B is "40," and the deterioration degree of the FC system 200C is "35." Therefore, the power generation controller 108 determines the FC system 200C among the FC systems 200A to 200C as an FC system to be allowed to generate electric power, and causes the determined FC system 200C to generate electric power so that the amount of electric power to be generated by the FC system 200C is greater than or equal to the required amount of electric power.

As described above, by operating the FC system in accordance with the required amount of electric power, it is possible to improve fuel efficiency and improve overall system efficiency. By performing control so that a deterioration progress degree is uniform, the overall system lifespan can be extended and the system efficiency (power supply efficiency) can be improved.

[Processing Flow]

Figure 10:
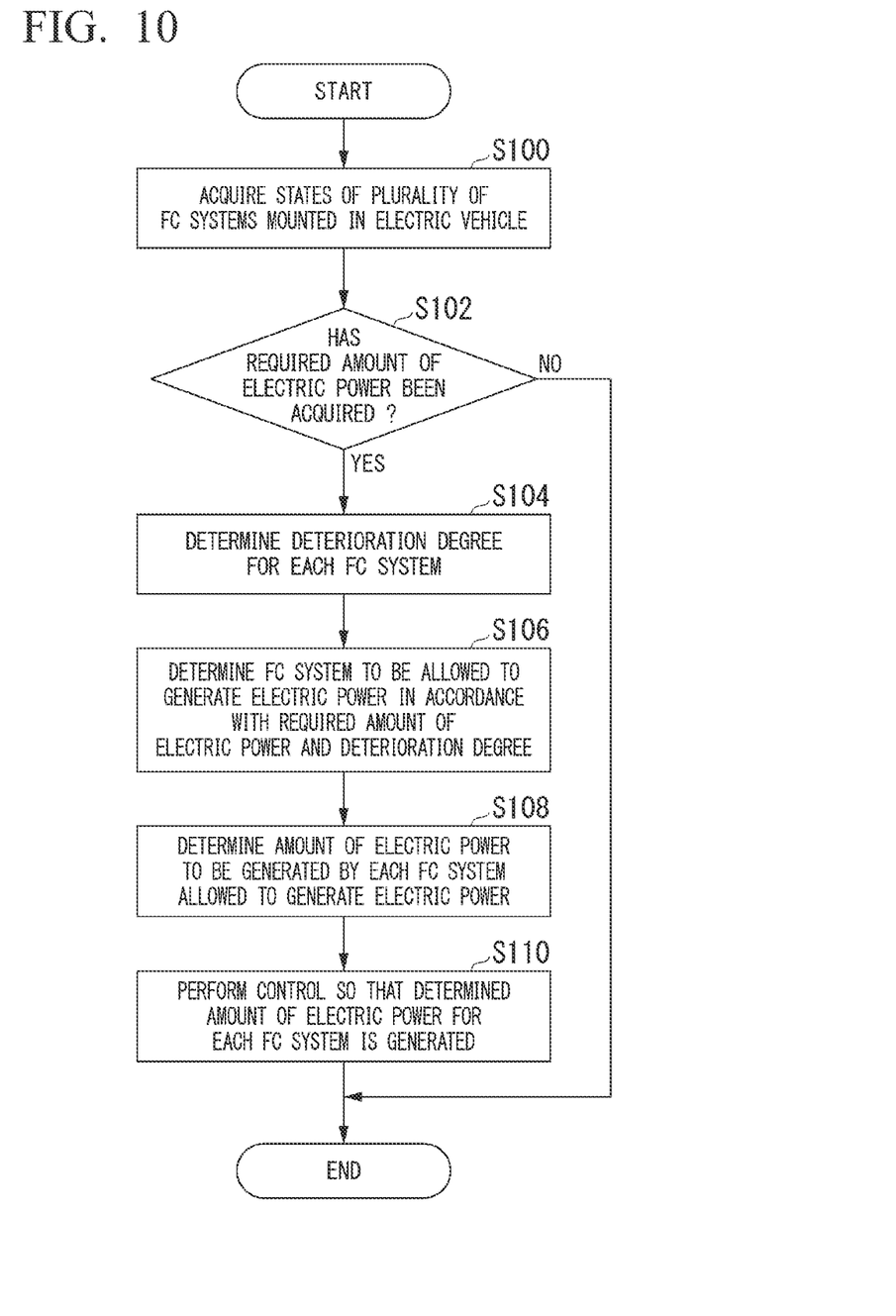
FIG. 10 is a flowchart showing an example of a flow of a process executed by a computer of the power supply control system according to the embodiment.

Hereinafter, a flow of a process executed by a computer of the power supply control system according to the embodiment will be described using a flowchart. In the following process, the process of power supply control by a plurality of FC systems mounted in the electric vehicle 10 will be mainly described. FIG. 10 is a flowchart showing an example of a flow of a process executed by the computer of the power supply control system according to the embodiment. The process of FIG. 10 is iteratively executed, for example, at a predetermined timing or at a predetermined interval while the electric vehicle 10 is traveling.

In the example of FIG. 10, first, the state acquirer 102 acquires states of the plurality of FC systems mounted in the electric vehicle 10 (step S100). In the processing of step S100, the state acquirer 102 may cause the storage 150 to store acquired state information as the state information 152. Subsequently, the required electric power acquirer 104 determines whether or not a required amount of electric power to be supplied to the load of the electric vehicle 10 has been acquired (step S102). When it is determined that the required amount of electric power has been acquired, the deterioration degree determiner 106 determines a deterioration degree for each FC system on the basis of the state information of the plurality of FC systems (step S104). The processing of step S104 may be executed after the processing of step S100 and before the processing of step S102.

Subsequently, the power generation controller 108 determines an FC system that is allowed to generate electric power in accordance with the required amount of electric power and the deterioration degree (step S106). Subsequently, the power generation controller 108 determines an amount of electric power to be generated by each determined FC system (step S108). Subsequently, the power generation controller 108 controls a target FC system so that the determined amount of electric power to be generated by each FC system is generated (step S110). Thereby, the process of the present flowchart ends. When it is determined that the required amount of electric power has not been acquired in the processing of step S102, the process of the present flowchart ends.

According to the embodiment described above, there is provided a power supply control system including: the state acquirer 102 configured to acquire states of a plurality of FC systems 200 mounted in the electric vehicle 10 (an example of an electric device); the required electric power acquirer 104 configured to acquire a required amount of electric power from the electric vehicle 10; and the power generation controller 108 configured to control power generation of one or more FC systems 200 among the plurality of FC systems 200 so that the required amount of electric power acquired by the required electric power acquirer 104 is satisfied on the basis of the state of each of the plurality of FC systems 200 acquired by the state acquirer 102, so that the system efficiency (power generation efficiency, power supply efficiency, and the like) of the fuel cell system can be further improved.

Specifically, in the embodiment, for example, when a plurality of FC systems mounted in an electric device are combined to generate electric power, the availability of an operation of each system or the amount of electric power to be generated is controlled on the basis of system efficiency and a state of deterioration in each system in accordance with a load (required electric power) required by the electric device. Thereby, it is possible to enable power supply control with optimum efficiency for the combined systems as a whole. Therefore, the lifespan of the entire system can be extended.

The above-described embodiment can be represented as follows.

A power supply control system including:

a storage device storing a program; and a hardware processor, wherein the hardware processor executes the program stored in the storage device to:

acquire states of a plurality of fuel cell systems mounted in an electric device that operates using electric power;

acquire a required amount of electric power from the electric device; and control power generation of one or more fuel cell systems among the plurality of fuel cell systems so that the acquired required amount of electric power is satisfied on the basis of the acquired state of each of the plurality of fuel cell systems.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A power supply control system comprising:
a state acquirer configured to acquire states of a plurality of fuel cell systems mounted in an electric device that operates using electric power;
a power acquirer configured to acquire a required amount of electric power from the electric device; and
a power generation controller configured to control power generation of one or more fuel cell systems among the plurality of fuel cell systems so that the required amount of electric power acquired by the power acquirer is satisfied on the basis of the state of each of the plurality of fuel cell systems acquired by the state acquirer,
wherein the power generation controller acquires a progress state of deterioration from the transition of the deterioration degree for each of the plurality of fuel cell systems from the change in the degree of deterioration over time and preferentially causes generation of the electrical power from the fuel cell system with a slowest degradation progression compared to other fuel cell systems.

2. The power supply control system according to claim 1, wherein the state acquirer acquires a deterioration degree in each of the plurality of fuel cell systems on the basis of at least one of a total power generation time period of each of the plurality of fuel cell systems, a power generation time period for each power generation state, the number of activations, and the number of stops.

3. The power supply control system according to claim 2, wherein the power generation controller causes the fuel cell system having a lower deterioration degree among the plurality of fuel cell systems to generate the electric power preferentially.

4. The power supply control system according to claim 2, wherein the power generation controller determines a number of fuel cell systems to be allowed to generate the electric power and an amount of electric power to be generated by each fuel cell system on the basis of the required amount of electric power and one or both of the deterioration degree and the power generation efficiency of each of the plurality of fuel cell systems acquired by the state acquirer.

5. The power supply control system according to claim 2, wherein the power generation controller causes one or more fuel cell systems among the plurality of fuel cell systems to generate the electric power so that a difference in deterioration degrees, total power generation time periods, the number of activations, or the number of stops of the plurality of fuel cell systems becomes small on the basis of the required amount of electric power.

6. The power supply control system according to claim 1, wherein, when a number of fuel cell systems to be allowed to generate the electric power is increased on the basis of the required amount of electric power, the power generation controller causes the electric power to be generated so that an amount of electric power to be generated by the fuel cell system which is generating the electric power exceeds an amount of electric power to be generated serving as a reference for increasing the number of fuel cell systems.

7. The power supply control system according to claim 1, wherein the electric device is a moving object.

8. A power supply control method comprising:
acquiring, by a computer, states of a plurality of fuel cell systems mounted in an electric device that operates using electric power;
acquiring, by the computer, a required amount of electric power from the electric device; and
controlling, by the computer, power generation of one or more fuel cell systems among the plurality of fuel cell systems so that the acquired required amount of electric power is satisfied on the basis of the acquired state of each of the plurality of fuel cell systems,
acquiring, by the computer, a progress state of deterioration from the transition of the deterioration degree for each of the plurality of fuel cell systems from the change in the degree of deterioration over time; and
preferentially causing, by the computer, generation of the electric power from the fuel cell system with a slowest degradation progression compared to other fuel cell systems.

9. A computer-readable non-transitory storage medium storing a program for causing a computer to:
acquire states of a plurality of fuel cell systems mounted in an electric device that operates using electric power;
acquire a required amount of electric power from the electric device; and
control power generation of one or more fuel cell systems among the plurality of fuel cell systems so that the acquired required amount of electric power is satisfied on the basis of the acquired state of each of the plurality of fuel cell systems,
acquire a progress state of deterioration from the transition of the deterioration degree for each of the plurality of fuel cell systems from the change in the degree of deterioration over time; and
preferentially cause generation of the electric power from the fuel cell system with a slowest degradation progression compared to other fuel cell systems.

10. A power supply control system comprising:
a state acquirer configured to acquire states of a plurality of fuel cell systems mounted in an electric device that operates using electric power;
a power acquirer configured to acquire a required amount of electric power from the electric device; and
a power generation controller configured to control power generation of one or more fuel cell systems among the plurality of fuel cell systems so that the required amount of electric power acquired by the power acquirer is satisfied on a basis of the state of each of the plurality of fuel cell systems acquired by the state acquirer,
wherein, when a number of fuel cell systems to be allowed to generate the electric power is increased on a basis of the required amount of electric power, the power generation controller causes the electric power to be generated so that an amount of electric power to be generated by the fuel cell system which is generating the electric power exceeds an amount of electric power to be generated serving as a reference for increasing the number of fuel cell systems.

* * * * *